US012047532B2

(12) United States Patent
Rist

(10) Patent No.: US 12,047,532 B2
(45) Date of Patent: **\*Jul. 23, 2024**

(54) METHOD AND SYSTEM FOR AUTOMATIC TRANSMISSION OF STATUS INFORMATION

(71) Applicant: RingCentral, Inc., Belmont, CA (US)

(72) Inventor: Claus Rist, Bochum (DE)

(73) Assignee: RingCentral, Inc., Belmont, CA (US)

( \* ) Notice: Subject to any disclaimer, the term of this patent is extended or adjusted under 35 U.S.C. 154(b) by 70 days.

This patent is subject to a terminal disclaimer.

(21) Appl. No.: 17/650,964

(22) Filed: Feb. 14, 2022

(65) Prior Publication Data
US 2022/0174149 A1 Jun. 2, 2022

Related U.S. Application Data

(63) Continuation of application No. 16/215,724, filed on Dec. 11, 2018, now Pat. No. 11,283,918, which is a (Continued)

(30) Foreign Application Priority Data

Aug. 26, 2010 (EP) .................................... 10008900
Nov. 19, 2010 (EP) .................................... 10014794

(51) Int. Cl.
*H04L 51/02* (2022.01)
*H04L 65/1033* (2022.01)
(Continued)

(52) U.S. Cl.
CPC ........ *H04M 3/42365* (2013.01); *H04L 51/02* (2013.01); *H04L 65/104* (2013.01);
(Continued)

(58) Field of Classification Search
CPC .......... H04M 3/42365; H04M 3/42382; H04L 65/1063; H04L 65/1069; H04L 65/104
See application file for complete search history.

(56) References Cited

U.S. PATENT DOCUMENTS 5,414,762 A 5/1995 Flisik
6,351,522 B1 2/2002 Vitikainen
(Continued)

FOREIGN PATENT DOCUMENTS

CA 214164 A1 6/2008
CN 1681250 A 10/2005
(Continued)

*Primary Examiner* — Daniel C Washburn
*Assistant Examiner* — Oluwadamilola M Ogunbiyi
(74) *Attorney, Agent, or Firm* — Finnegan, Henderson, Farabow, Garrett & Dunner, LLP

(57) ABSTRACT

A method for automatic transmission of status information from a first communications terminal set up for speech communication to a second communications terminal set up for text communication is provided. The speech communication between communications terminals is processed over a speech communications server and the text communication between communications terminals over a text communications server. The speech communications server and the text communications server exchange messages over at least one converter device. The status information will be transmitted from the first communications terminal over the speech communications server, the converter device, and the text communications server to the second communications terminal.

20 Claims, 4 Drawing Sheets

Related U.S. Application Data continuation of application No. 14/963,588, filed on Dec. 9, 2015, now Pat. No. 10,187,523, which is a continuation of application No. 13/204,851, filed on Aug. 8, 2011, now abandoned.

(51) Int. Cl.

| | | |
|---|---|---|
| *H04L 65/1063* | (2022.01) | |
| *H04L 65/1069* | (2022.01) | |
| *H04M 3/42* | (2006.01) | |
| *H04M 7/00* | (2006.01) | |
| *H04M 7/12* | (2006.01) | |

(52) U.S. Cl.
CPC ...... *H04L 65/1063* (2013.01); *H04L 65/1069* (2013.01); *H04M 3/42382* (2013.01); *H04M 7/0012* (2013.01); *H04M 7/1205* (2013.01)

(56) References Cited

U.S. PATENT DOCUMENTS

| | | |
|---|---|---|
| 7,016,847 B1 | 3/2006 | Tessel et al. |
| 7,130,401 B2 | 10/2006 | Rampey et al. |
| 7,206,388 B2 | 4/2007 | Diacakis |
| 7,274,926 B1 | 9/2007 | Laumen et al. |
| 7,277,949 B2 | 10/2007 | Jung |
| 7,535,997 B1 | 5/2009 | McQuaide, Jr. |
| 8,170,197 B2 | 5/2012 | Odinak |
| 8,194,831 B2 | 6/2012 | Hepworth et al. |
| 8,620,663 B2 | 12/2013 | Kondo |
| 2001/0012781 A1 | 8/2001 | Suzuki |
| 2002/0069062 A1 | 6/2002 | Hyde-Thomson |
| 2003/0154086 A1 | 8/2003 | Nygren |
| 2003/0154240 A1 | 8/2003 | Nygren |
| 2003/0177251 A1 | 9/2003 | Suzuki et al. |
| 2003/0200298 A1 | 10/2003 | Su |
| 2003/0215080 A1 | 11/2003 | Wengrovitz |
| 2004/0058652 A1 | 3/2004 | McGregor |
| 2004/0128020 A1 | 7/2004 | Fischbach |
| 2004/0146047 A1 | 7/2004 | Turcan |
| 2004/0203432 A1 | 10/2004 | Patil |
| 2005/0030928 A1 | 2/2005 | Virtanen |
| 2005/0054334 A1 | 3/2005 | Brown |
| 2005/0086496 A1 | 4/2005 | Sandberg |
| 2005/0096094 A1 | 5/2005 | Kim et al. |
| 2005/0144621 A1 | 6/2005 | Millbery |
| 2005/0164681 A1* | 7/2005 | Jenkins ............. H04M 1/72433 379/88.22 |
| 2005/0198147 A1* | 9/2005 | Pastro ............... H04M 3/42382 379/93.24 |
| 2006/0178128 A1* | 8/2006 | Eaton ...................... H04W 4/90 455/404.1 |
| 2007/0032194 A1 | 2/2007 | Griffin |
| 2007/0112571 A1 | 5/2007 | Thirugnana |
| 2007/0130260 A1 | 6/2007 | Weintraub et al. |
| 2007/0217594 A1* | 9/2007 | Giacometto ...... H04M 3/42374 379/219 |
| 2007/0232347 A1 | 10/2007 | Persson |
| 2007/0240189 A1* | 10/2007 | Paila ..................... H04L 67/51 725/62 |
| 2008/0089504 A1* | 4/2008 | Veenstra ................. H04M 3/42 379/207.02 |
| 2008/0098060 A1* | 4/2008 | Boni .................... H04L 65/1069 709/201 |
| 2008/0118051 A1 | 5/2008 | Odinak |
| 2008/0120421 A1 | 5/2008 | Gupta |
| 2008/0120692 A1 | 5/2008 | Gupta |
| 2009/0028306 A1 | 1/2009 | Rhie |
| 2009/0055187 A1 | 2/2009 | Leventhal |
| 2009/0325621 A1 | 12/2009 | Rossotto |
| 2010/0142688 A1* | 6/2010 | Karnalkar ......... H04M 3/42059 345/173 |
| 2010/0211604 A1* | 8/2010 | Campbell ............ H04W 8/183 707/E17.014 |
| 2010/0273455 A1 | 10/2010 | Tamura |
| 2010/0312847 A1 | 12/2010 | Boberg |
| 2011/0003582 A1 | 1/2011 | Park |
| 2011/0026517 A1 | 2/2011 | Capuozzo |
| 2012/0076133 A1 | 3/2012 | Thompson |
| 2012/0134321 A1* | 5/2012 | Amidon ................ H04W 76/10 370/328 |

FOREIGN PATENT DOCUMENTS

| | | | |
|---|---|---|---|
| EP | 1549024 A1 | 6/2005 | |
| EP | 1589717 A2 | 10/2005 | |
| GB | 2386512 A * | 9/2003 | ............. H04L 67/24 |
| WO | WO-2007115463 A1 * | 10/2007 | ........ H04M 3/42017 |

* cited by examiner

METHOD AND SYSTEM FOR AUTOMATIC TRANSMISSION OF STATUS INFORMATION

CROSS-REFERENCE TO RELATED APPLICATIONS

This application is a continuation of application Ser. No. 16/215,724, filed Dec. 11, 201 (allowed), which is a continuation application of U.S. patent application Ser. No. 14/963,588, filed Dec. 9, 2015, issued as U.S. Pat. No. 10,187,523 on Jan. 22, 2019, which is a continuation of U.S. patent application Ser. No. 13/204,851, filed Aug. 8, 2011 which claims priority to European Patent Office Application No. EP 10 014 794.1, filed on Nov. 19, 2010, and European Patent Office Application No. 10 008 900.2, filed on Aug. 26, 2010. All of the above-referenced applications are incorporated by reference herein.

BACKGROUND OF THE INVENTION

Field of the Invention

Embodiments relate to a method and an arrangement for automatic transmission of status information from at least one first communications terminal set up for speech communication, to at least one second communications terminal set up for text communication.

Background of the Related Art

There are a number of terminal sets that include at least one first communications terminal set up for speech communication and a second communications terminal set up for text communication. Examples of such communications terminals set up for speech communications are telephone terminals, commonly known as telephones, for example, fixed network telephones, mobile telephones or other communications terminals set up for speech communications. In addition to these communications terminals set up for speech communications, other communications terminals have long been known which are set up primarily or exclusively for text communications, such as for example, communications terminals for the reception and/or for sending of messages in text form, such as for example, emails, SMS, or other communications in text form.

Communications terminals of this kind are frequently connected by a communications infrastructure, which normally includes also a communications server which enables the transmittal or a transport of messages or other information between the terminals involved.

Communications terminals set up for speech communications are usually connected together by one or several speech communications servers whose technical design depends on the communications technology used. For example, telephone terminals in classical telephone networks are interconnected by means of call processing systems or even by a hierarchy of call processing systems, which can each comprise private and/or public call processing systems, depending on their complexity or coverage.

With the increasing expansion of data networks, such as the internet for example, which is being used increasingly for speech communications also, in addition to classical speech communications servers, i.e. conventional call processing systems, other types of speech communications servers are being used which transport or transmit speech messages in digitized format in a manner similar to other data appearing in data networks which are not generated by digitizing of speech messages. Examples of such speech communications servers are virtually all types of network elements commonly used in data networks for data transport, because it fundamentally makes no difference for the transmission of digital data whether or not these data have been created by digitizing of speech signals.

Due to the increasing standardization of communications networks associated with the integration of speech communications networks and text communications networks into general data communications networks, the distinction between speech communication, text communication and other forms of communication, such as picture or video data communication for example, is increasingly becoming less a question of hardware architecture and more a question of the software products being run on increasingly more standardized hardware architectures used for data communication for the communications protocols that are appropriate to the nature and origin of the particular data being transported and to requirements associated therewith. For example, in the transmission of speech data in data networks, a greater demand is placed on the transmission speed of the data than in text communications networks in which it is often less important whether an email or an SMS requires one-tenth or one-half second for its transmission.

The differentiation between communications terminals for speech communications and for text communications is thus increasingly becoming a question of the usage of certain services or protocols than a question of the equipment used and hardware architectures. For example, a personal computer, a device known as a Smart-Phone or a Notebook today can easily integrate the functions of a telephone terminal and an email client in one device. The network elements used to create network functions thus regularly and simultaneously perform the functions of speech communications servers and text communications servers, or even more generally of data communications servers, wherein the differences in the various type of communications are less a question of hardware and more a question of the communications protocols used.

BRIEF SUMMARY OF THE INVENTION

In several forms of text communication, often referred to as Instant Messaging, it is desirable that the user of these forms of communication be informed about the availability of a speech communications channel to other users with whom they wish to be connected at that moment or occasionally. Thus in the course of a text-based communication, the request may arise to be able to call a communications partner over a speech communications service, in particular over a telephone. In such cases it is desirable to be informed about the availability or accessibility of the user over one such speech communications service or to be informed—especially to know—whether a telephone terminal of a particular user is presently busy or free.

Embodiments of the invention may enable or at least simplify the functional integration of different communications channels, in particular of speech communications channels and text communications channels.

According to embodiments of the invention, a method for automatic transmission of status information from at least one first communications terminal set up for voice communication, to at least one second communications terminal set up for text communication, is described in which the speech communication between communications terminals is processed over at least one speech communications server and the text communication between communications terminals is processed over at least one text communications server. In this method, the at least one speech communications server and the at least one text communications server exchange messages over at least one converter device, and the status information from the at least one first communications terminal is transmitted over the at least one speech communications server, the at least one converter device and the at least one text communications server to the at least one second communications terminal.

DETAILED DESCRIPTION OF THE INVENTION

Figure 1:
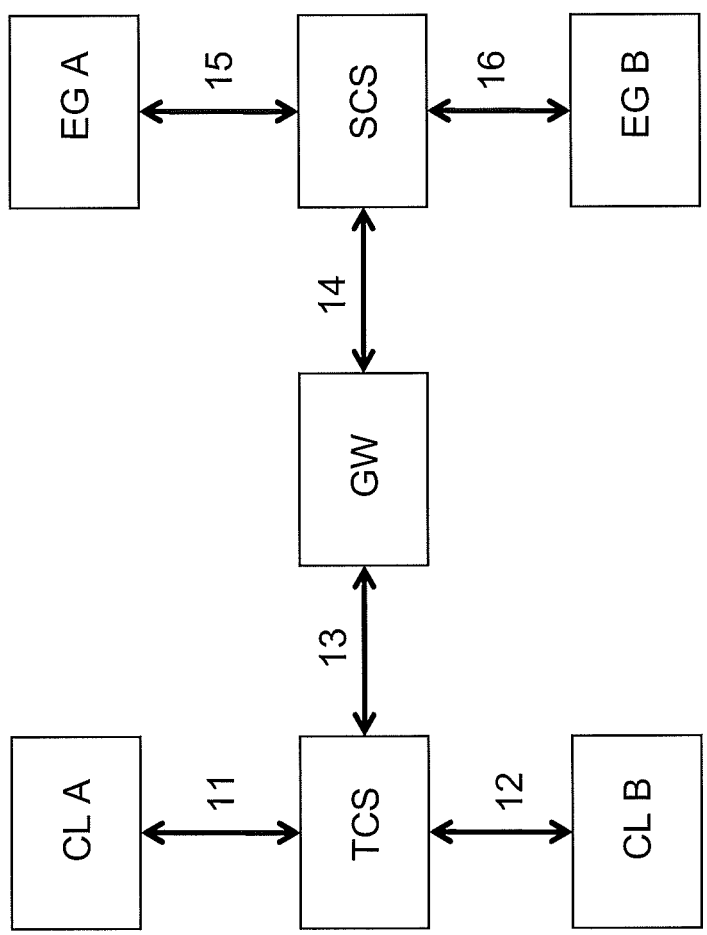
FIG. 1 A schematic illustration of one preferred embodiment of an arrangement according to the invention and of an exchange of information according to the invention as illustrated by a preferred embodiment of the invented method.

According to one preferred embodiment, the invention provides that the transmission of status information between a speech communications server and a text communications server takes place when the text communications server has signaled beforehand to the speech communications server that the transmission is to occur.

The term of communications terminal in connection with the present invention is understood to be any kind of communications device used by a communications subscriber to exchange, transmit or receive messages from other communications subscribers, in particular speech messages, text messages or even other messages, such as for example, picture or video messages. For communication with other communications subscribers, the communications subscriber using the communications terminal will make use of the features of at least one communications service, for example, a telephone service, an e-mail service, a Short Message Service or other communications services.

A communications terminal set up for speech communication in this respect is understood to be any kind of communications terminal that enables the user to communicate by means of natural, spoken speech, i.e. through the input of corresponding acoustic signals to a corresponding electro-acoustic converter and subsequent conversion of these acoustic signals into electrical signals, preferably subsequent digitizing of the electric signals and transmission of the preferably digitized electric signals to another communications subscriber. Examples of such communications terminals are telephone terminals, in particular fixed network telephones, mobile telephones, Internet telephones (Voice over IP) or other telephone terminals.

Some communications terminals set up for text communication in this regard are understood to be any kind of communications terminal enabling its user to communicate with other communications subscribers through the exchange of text messages. Examples of such communications terminals set up for text communication are personal computers or Notebooks equipped with e-mail-clients or other applications intended for text-based communications, such as so-called Chat Clients, but additionally also mobile telephones through which SMS messages can be sent or received, and similar devices.

In this context, a speech communications server is understood to be any device which is set up for or suitable for processing or transmittal of speech messages which are exchanged or are to be transmitted between communications terminals set up for speech communications. Examples of such speech communications servers are, in particular, public or private branch exchanges or call processing systems, but also internet-capable network components set up for speech communication, such as switches or routers.

In this context, a text communications server is understood to be any device suitable for or set up for the transmission or routing of text messages between communications terminals set up for text communication. Text communications servers are thus in particular the so-called SMTP-servers or other e-mail servers based on different protocols, or similar apparatuses which are set up for the transmittal, reception, sending or routing of text messages.

In this context, a converter device is understood to be a network component or a constituent of a network component in the transmission of messages between a speech communications server and a text communications server that incorporates the protocols and standards used in the respective servers for the transmission and performs a conversion independently of the direction of transmission of the message, so that message transmittal is enabled between network components and terminals of the two types of communications. Converter devices of this kind are already quite well-known to a person skilled in the art and are also known as gateways.

In accordance with one preferred embodiment, the invention provides that the transmission of status information between a speech communications server and a text communications server takes place to the extent specified by a previous signaling. Preferably a transmission of status information takes place in conjunction with and/or according to a previous signaling, wherein in the case of a change in status of a communications terminal of the speech communications server set up for speech communications, through which this communications terminal communicates with other terminals, the change in status is signaled by a text communications server which is capable of exchanging status information with the speech communications server over a converter device.

Then preferably only that status information is transmitted which is suitable and/or necessary to indicate to the text communications server the change in status of the communications terminal set up for speech communication, so that the text communications server is in a position to inform the connected communications terminal, set up for text communication, of the change in status.

According to one preferred embodiment of the invention, at least one transmitted status information item contains at least one presence information item. In this context, the presence information item is understood to be an information item which provides information about the possibility and/or readiness of a potential communication partner to enter into and participate in communication, in particular in speech communication. The client of a communications subscriber, that is, preferably software running on the communications subscriber's communications terminal, transmits the presence status preferably to a presence server that administers and potentially processes the presence status, that is, the presence information.

The client of a communications subscriber thus determines whether and if necessary, in what manner, the presence status is publicized in order to inform other communications subscribers of the current communications status of this user. Due to this kind of status publication, other communication subscribers, who are communicating or intend to communicate with the particular communication subscriber, will be informed about his availability and readiness to communicate. Examples of possible values for the presence status in a text-based communication system are information such as "available for chat," "present," "absent," "busy," "please do not disturb."

Other preferred embodiments of the invention provide that at least one text communications server transmits messages without being prompted. In this so-called push mode, messages are not checked by a client via a query to the server, but rather the client is always ready to receive and the server transmits messages according to the situation, preferably with no delay after their arrival.

According to the present invention, in addition an arrangement is provided for automatic transmission of status information from at least one first communications terminal set up for voice communication, to at least one second communications terminal set up for text communication, with at least one speech communications server for processing of the speech communication between communications terminals and at least one text communications server for processing of text communication between communications terminals. In this regard, at least one converter device is provided through which the at least one speech communications server and the at least one text communications server exchange messages. The status information is transmitted from the at least one first communications terminal over the at least one speech communications server, the at least one converter device and the at least one text communications server, to the at least one second communications terminal.

According to one preferred embodiment, the invention provides that the arrangement is set up such that the transmission of status information between a speech communications server and a text communications server takes place when the text communications server has first signaled to the speech communications server that the transmission is to occur.

An additional advantage of the invention is that the arrangement is set up so that the transmission of status information between a speech communications server and a text communications server takes place to the extent specified by a previous signaling. Particularly preferred embodiments of the invention are those in which at least one transmitted status information item contains at least one presence information item.

In accordance with an additional, preferred embodiment, the invention provides that at least one text communications server transmits messages without being prompted.

The invention will be explained in greater detail below based on preferred exemplary embodiments and with reference to the figures.

Important examples of so-called Instant Messaging Systems, that is, of text-based communication systems within the meaning of the present invention, are those client/server architectures based on the XMPP protocol which typically run asynchronously to telephony communication applications. For example, the present invention enables the automatic transmission of an "on phone" ("telephoning") status from a telephone to an XMPP-client.

In this case preferably the XMPP-client subscribes via an XMPP-server to a so-called CTI service (CTI=Computer Telephony Integration) with a speech communications server, for example, with a private or public branch exchange (PBX), wherein this functionality is provided over a Call Control Gateway (CCGW), that is, a special form of a converter device. The CCGW herein is a link between the CTI of a PBX and the XMPP-server (text communications server). The CTI services enable the XMPP-client to monitor or to change the status of the associated telephone and for example, to pass this information to other XMPP-clients by means of the XMPP presence stanza.

Due to the automatic transmission of the telephone status according to the invention, the presence information of the user will always be kept to the current status. XMPP-client and telephone are synchronized automatically. Manual transmission of information is thus unnecessary. Due to the simplified presence administration according to the invention, time savings and the associated cost savings are possible.

FIG. 1 presents one preferred exemplary embodiment of an arrangement according to the invention. In this example a speech communications server SCS is connected with two terminals EGA and EGB set up for speech communication, and exchanges speech messages and status information 15, 16 with these two communications terminals. For example, if the status of the communications terminal EGA changes, then this communications terminal EGA transmits a corresponding status information item to the speech communications server SCS, whereupon the latter transmits the status information or corresponding status change information 14 to the converter device GW.

Thereupon, the converter device GW transmits corresponding status information or status change information 13 to the text communications server TCS with which the two text communications clients CLA and CLB are communicating 11, 12.

In this example, the text communications client CLA is used by the communications subscriber which also uses the speech communications terminal EGA. Accordingly, the text communications client CLB is used by the communications subscriber which also uses the speech communications terminal EGB.

In this manner it is possible that the communications subscriber who is using the text communications client CLB, is informed of a change in status of the speech communications terminal EGA, without the user A having to initiate a manual transmission of information to user B.

Figure 2:
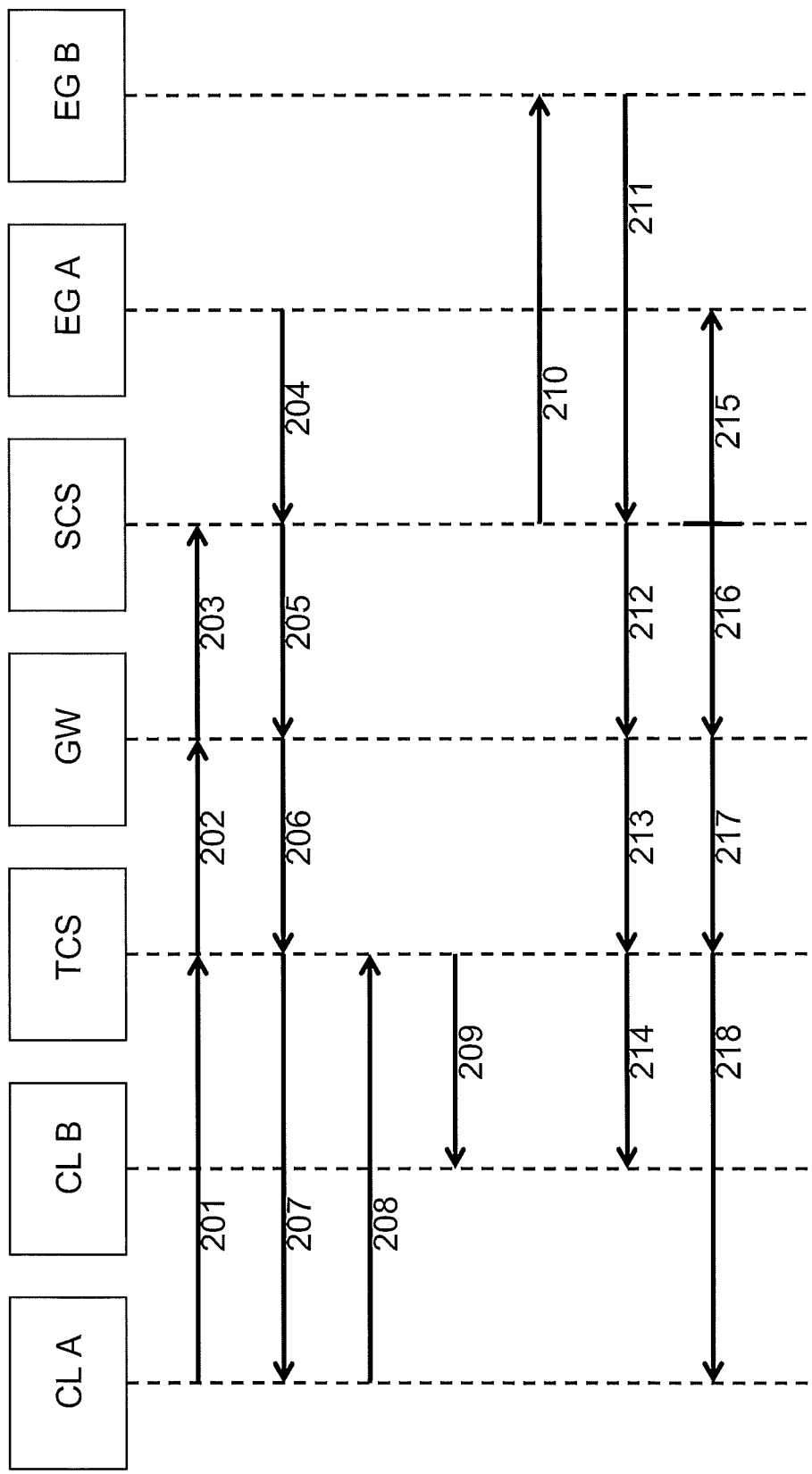
FIG. 2 A sequence diagram as a schematic illustration of the exchange of information according to a first embodiment of the present invention.

FIG. 2 shows a first example of information transmission according to the invention in one preferred exemplary embodiment. In this example, the communications subscriber A initiates a CTI-supported call on his XMPP-client CLA to communications subscriber B. With the start of this action, subscriber A sets his presence status to "telephoning." In this regard the XMPP-client CLA transmits status information 201, for example, a CSTA-stanza "make call" to the XMPP-server TCS. Next, the XMPP-server TCS transmits corresponding status information 202, for example, the corresponding CSTA-stanza "make call" to the converter device GW, in this example, the CCGW, a Call Control Gateway or protocol converter.

The status information in this regard is transmitted preferably as a so-called CSTA-stanza, i.e. preferably as status information embedded in the XMPP-protocol corresponding to the CSTA-protocol. The acronym CSTA here stands for Computer Supported Telephony Application. Subsequently, the converter device GW transmits a corresponding information item 203, for example the CSTA-message "make call" to the speech communications server SCS. This speech communications server is now informed that subscriber A would like to initiate a call to subscriber B. The speech communications terminal of subscriber A EGA then sends a message 204 "set up/invite" to the speech communications terminal SCS. The latter transmits a corresponding message "service initiated" to the converter device GW 205. Next, the converter device sends a corresponding information item 206 to the XMPP-server TCS and the latter passes the corresponding information item 207, for example, a CSTA-stanza "service initiated" to the XMPP-client CLA of subscriber A.

Then the XMPP-client CLA sends an information item 208, for example, a presence stanza "on phone" to the text communications server TCS, whereupon the latter sends corresponding information 209, namely the presence stanza "on phone" to the text communications client CLB. In addition, the speech communications server SCS sends an information item 210 ("set up/invite") to the speech communications terminal EGB of subscriber B.

The signals "set up" and/or "invite" here correspond to the usual ISDN and/or SIP signals "set up" and/or "invite," respectively. The speech communications terminal EGB of subscriber B now sends a message 211 "alert/180 ringing" to the speech communications server SCS, whereupon the latter sends a message 212, for example, the CSTA message "delivered," to the converter device GW, which passes a corresponding message 213, for example, the CSTA-stanza "delivered" to the XMPP-Server TCS. The latter finally sends a message 214, for example, the CSTA-stanza "delivered" to the XMPP-client CLB of subscriber B.

Now the speech communications server SCS sends a message 215, "alert/180 ringing," to the speech communications terminal EGA and a message 216, CSTA "delivered" to the converter device GW. Subsequently, the converter device GW sends a message 217, for example, the CSTA-stanza "delivered" to the XMPP-server TCS, which finally transmits a corresponding message 218 to the XMPP-client CLA of user A. The messages "alert" and/or "ringing" here again have the usual meanings according to the ISDN or SIP standard.

Figure 3:
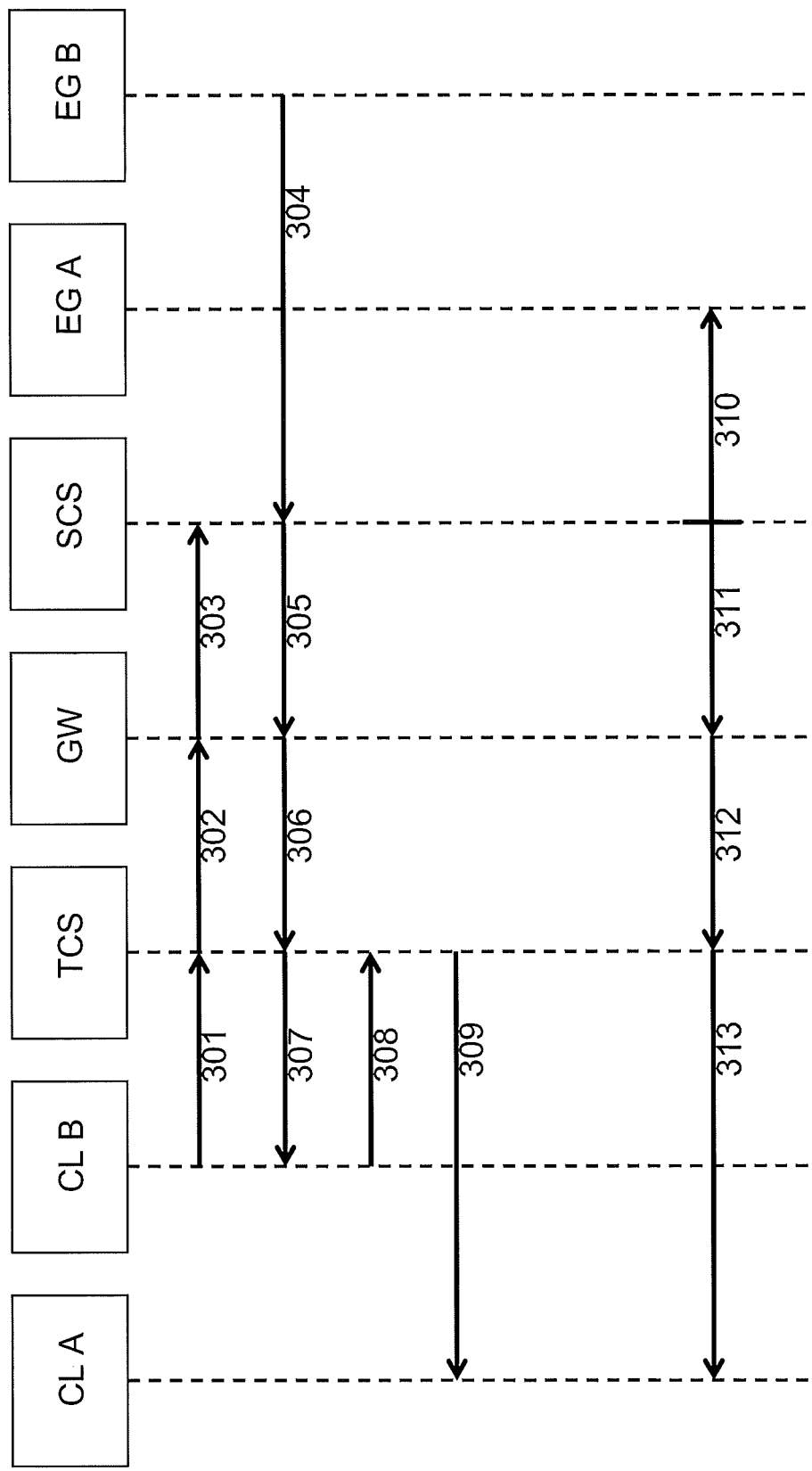
FIG. 3 A sequence diagram as a schematic illustration of the exchange of information according to a second embodiment of the present invention.

FIG. 3 shows a second example of information transmission according to the invention in one preferred exemplary embodiment. In this example, the communications subscriber B, supported by his XMPP-client CLB, answers the CTI-supported call of communications subscriber A. And thus the presence status of subscriber B is likewise set to "telephoning." In this regard, the XMPP-client CLB transmits status information 301, for example, a CSTA-stanza "answer call" to the XMPP-server TCS. Next, the XMPP-server TCS transmits corresponding status information 302, for example, the corresponding CSTA-stanza "answer call" to the converter device GW, in this example, the CCGW, a Call Control Gateway or protocol converter.

The status information in this regard is transmitted preferably as a so-called CSTA-stanza, i.e. preferably as status information embedded in the XMPP-protocol corresponding to the CSTA-protocol. The acronym CSTA here stands for Computer Supported Telephony Application.

Subsequently, the converter device GW transmits a corresponding information item 303, for example the CSTA-message "answer call" to the speech communications server SCS. This speech communications server is now informed that subscriber B would like to initiate a call to subscriber A.

The speech communications terminal of subscriber B EGB then sends a message 304 "connect/200 OK" to the speech communications terminal SCS. The latter routes a corresponding CSTA-message "established" to the converter device GW 305. Next, the converter device sends a corresponding information item 306 to the XMPP-server TCS and the latter passes the corresponding information item 307, for example, a CSTA-stanza "established" to the XMPP-client CLB of subscriber B.

Then the XMPP-client CLB sends an information item 308, for example, a presence stanza "on phone" to the text communications server TCS, whereupon the latter sends corresponding information 309, namely the presence stanza "on phone" to the text communications client CLA. In addition, the speech communications server SCS sends an information item 310 ("connect/200 OK") to the speech communications terminal EGA of subscriber A and a CSTA-message 311 ("established") to the converter device GW, which subsequently transmits this CSTA-message 311 as CSTA-stanza 312 to the client CLA of subscriber A 313 over the XMPP-server TCS within the scope of the XMPP.

Figure 4:
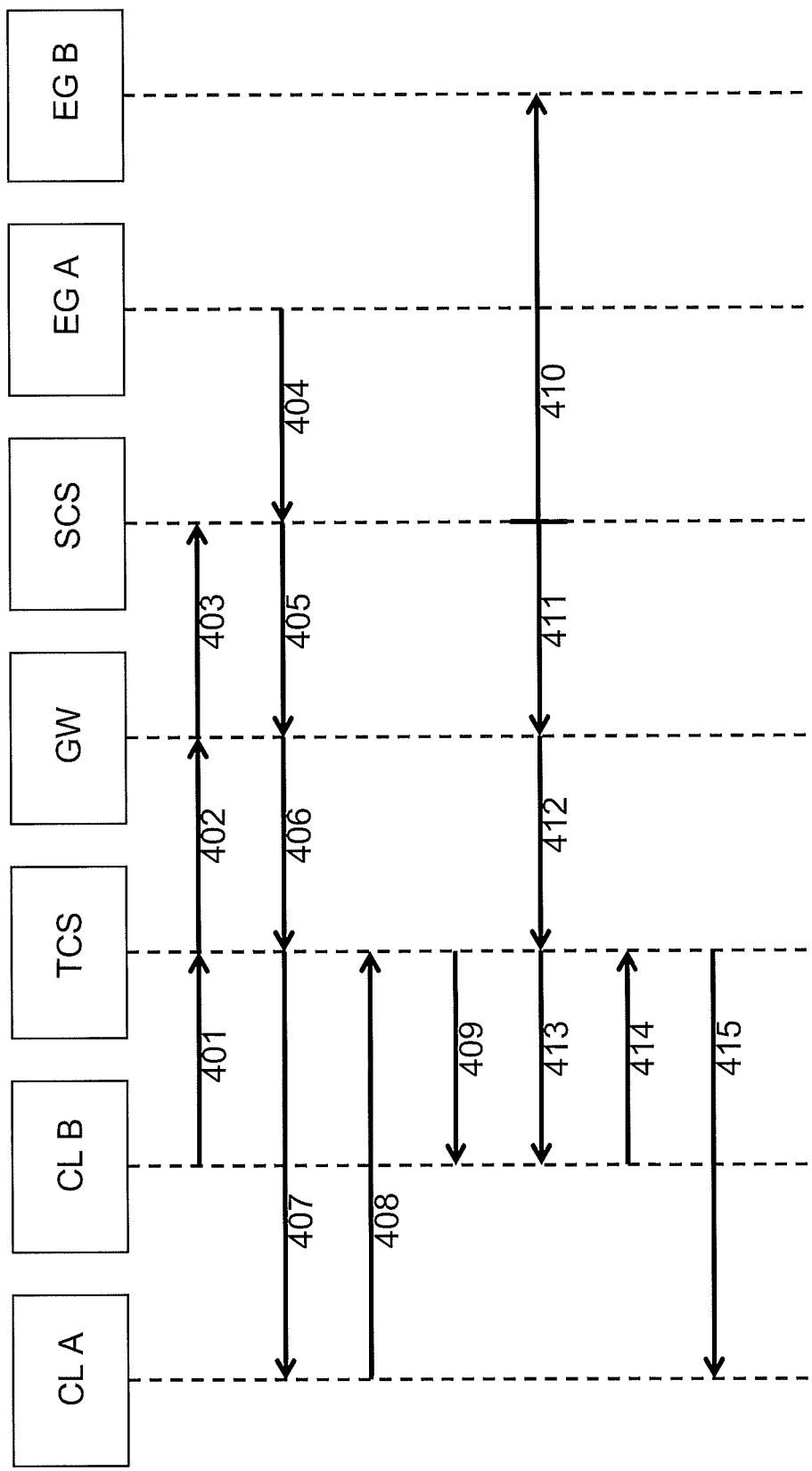
FIG. 4 A sequence diagram as a schematic illustration of the exchange of information according to a third embodiment of the present invention.

FIG. 4 shows a third example of information transmission according to the invention in one preferred exemplary embodiment. In this example, the conversation established by means of the XMPP-client with CTI-support will cease and the presence status is again automatically set to available.

At the beginning of this action, the XMPP-client CLB of subscriber B sends a signal "clear connection" to the speech communications server SCS. In this regard the XMPP-client CLB transmits status information 401, for example, a CSTA-stanza "clear connection" to the XMPP-server TCS. Next, the XMPP-server TCS transmits corresponding status information 402, for example, the corresponding CSTA-stanza "clear connection" to the converter device GW, in this example, the CCGW, a Call Control Gateway or protocol converter.

The status information in this regard is transmitted preferably as a so-called CSTA-stanza, i.e. preferably as status information embedded in the XMPP-protocol corresponding to the CSTA-protocol. Subsequently, the converter device GW transmits a corresponding information item 403, for example the CSTA-message "clear connection" to the speech communications server SCS. This speech communications server is now informed that subscriber B would like to terminate a call to subscriber A. The speech communications terminal of subscriber A EGA then sends a message 404 "disconnect/bye" to the speech communications terminal SCS. The latter passes a corresponding message "connection cleared" to the converter device GW 405. Next, the converter device sends a corresponding information item 406 to the XMPP-server TCS and the latter passes the corresponding information item 407, for example, a CSTA-stanza "connection cleared" to the XMPP-client CLA of subscriber A.

Then the XMPP-client CLA sends an information item 408, for example, a presence stanza to the text communications server TCS, whereupon the latter sends corresponding information 409, namely the presence stanza to the text communications client CLB. In addition, the speech communications server SCS sends an information item 410 ("disconnect/bye") to the speech communications terminal EGB of subscriber B.

The signals "disconnect" or "bye" here correspond to the usual ISDN or SIP signals "disconnect" or "bye." The speech communications server SCS additionally sends a message 411 "connection cleared" to the converter device GW, whereupon this converter device GW sends a message 412, for example, the CSTA-stanza "connection cleared" to the speech communications server SCS, which subsequently transmits a corresponding message 413, for example, the CSTA-stanza "connection cleared," to the XMPP-client CLB of subscriber B. Finally, the latter sends a message 414, for example, a presence stanza, to the XMPP-Server TCS. Finally, the XMPP-server TCS sends a corresponding message 415 to the XMPP-client CLA of user A.

I claim:

1. A method for transmitting status information, the method comprising:
   conveying speech communication to a first device via a speech communications server;
   conveying text communication to a second device via a text communications server;
   generating, by the first device, a status pertaining to the first device based on a message transmitted from the first device via the speech communications server, wherein the status comprises information indicating readiness of a user associated with the first device to participate in communications; and
   transmitting information corresponding to the status to the text communications server.

2. The method of claim 1, further comprising transmitting the status item to the second device.

3. The method of claim 1, further comprising receiving, at the speech communications server, the status pertaining to the first device.

4. The method of claim 1, wherein the information corresponding to the status is exchanged between the speech communications server and the text communications server to an extent specified by a signal to the speech communications server.

5. The method of claim 1, wherein the status is based on a Computer-Supported Telecommunications Applications (CSTA)-stanza associated with one of an ongoing voice communication or an ongoing voice communication attempt.

6. The method of claim 1, wherein the text communications server is configured to transmit messages without request.

7. The method of claim 1, wherein transmitting the information corresponding to the status occurs automatically in response to an attempt to initiate a call connection.

8. A system for transmitting status information, the system comprising:
   a processor;
   a memory operatively connected to the processor and storing instructions that, when executed by the processor, cause:
      conveying speech communication to a first device via a speech communications server;
      conveying text communication to a second device via a text communications server;
      causing the first device to generate a status pertaining to the first device based on a message transmitted from the first device via the speech communications server, wherein the status comprises information indicating readiness of a user associated with the first device to participate in communications; and
      transmitting information corresponding to the status to the text communications server.

9. The communication system of claim 8, wherein the memory stores further instructions that, when executed by the processor, cause transmitting the status item to the second device.

10. The communication system of claim 8, wherein the memory stores further instructions that, when executed by the processor, cause receiving, at the speech communications server, the status pertaining to the first device.

11. The communication system of claim 8, wherein the information corresponding to the status is exchanged between the speech communications server and the text communications server to an extent specified by a signal to the speech communications server.

12. The communication system of claim 8, wherein the status is based on a Computer-Supported Telecommunications Applications (CSTA)-stanza associated with one of an ongoing voice communication or an ongoing voice communication attempt.

13. The communication system of claim 8, wherein the text communications server is configured to transmit messages without request.

14. The communication system of claim 8, wherein transmitting the information corresponding to the status occurs automatically in response to an attempt to initiate a call connection.

15. A non-transitory, computer-readable medium storing instructions that, when executed by a processor, cause:
   conveying speech communication to a first device via a speech communications server;
   conveying text communication to a second device via a text communications server;
   causing the first device to generate a status pertaining to the first device based on a message transmitted from the first device via the speech communications server, wherein the status comprises information indicating readiness of a user associated with the first device to participate in communications; and
   transmitting information corresponding to the status to the text communications server.

16. The non-transitory, computer-readable medium of claim 15, wherein the memory stores further instructions that, when executed by the processor, cause transmitting the status item to the second device.

17. The non-transitory, computer-readable medium of claim 15, wherein the memory stores further instructions that, when executed by the processor, cause receiving, at the speech communications server, the status pertaining to the first device.

18. The non-transitory, computer-readable medium of claim 15, wherein the information corresponding to the status is exchanged between the speech communications server and the text communications server to an extent specified by a signal to the speech communications server.

19. The non-transitory, computer-readable medium of claim 15, wherein the status is based on a Computer-Supported Telecommunications Applications (CSTA)-stanza associated with one of an ongoing voice communication or an ongoing voice communication attempt.

20. The non-transitory, computer-readable medium of claim 15, wherein transmitting the information corresponding to the status occurs automatically in response to an attempt to initiate a call connection.

* * * * *